United States Patent [19]

Rayborn et al.

[11] Patent Number: 5,114,598

[45] Date of Patent: * May 19, 1992

[54] METHOD OF MAKING DRILLING FLUID CONTAINING ASPHALTITE IN A DISPERSED STATE

[75] Inventors: Jerry J. Rayborn, Franklintown, La.; J. Phillip Dickerson, McComb, Miss.

[73] Assignee: Sun Drilling Products Corporation, Belle Chasse, La.

[*] Notice: The portion of the term of this patent subsequent to May 19, 2009 has been disclaimed.

[21] Appl. No.: 473,474

[22] Filed: Feb. 1, 1990

[51] Int. Cl.$^5$ .................... E21B 33/13; E21B 43/00
[52] U.S. Cl. .................... 507/126; 166/285; 166/294; 507/106; 507/107; 507/138; 507/139
[58] Field of Search ............ 252/8.51, 8.511, 8.512, 252/8.514; 166/285, 294

[56] References Cited

U.S. PATENT DOCUMENTS

| | | | |
|---|---|---|---|
| 2,241,255 | 5/1941 | Garrison | 166/276 |
| 2,316,967 | 4/1943 | Miller | 252/8.51 |
| 2,316,968 | 4/1943 | Miller | 252/8.51 |
| 2,605,222 | 7/1952 | Jones | 252/8.511 |
| 2,773,031 | 12/1956 | Tailleur | 252/8.51 |
| 2,773,670 | 12/1956 | Miller | 252/8.51 |
| 2,805,991 | 9/1957 | Tailleur | 252/8.515 |
| 2,812,161 | 11/1957 | Mayhew | 252/8.512 |
| 2,854,214 | 9/1958 | McArthur et al. | 166/288 |
| 2,858,270 | 10/1958 | Harrison | 252/8.51 |
| 2,885,360 | 5/1959 | Haden et al. | 252/28 |
| 3,089,846 | 5/1963 | Pitchford | 252/8.51 |
| 3,215,628 | 11/1965 | Peacock | 252/8.51 |
| 3,264,214 | 8/1966 | Stratton | 252/8.51 |
| 3,314,489 | 4/1967 | Humphrey | 252/8.514 |
| 3,322,668 | 5/1967 | Fontenot et al. | 252/8.51 |
| 3,385,789 | 5/1968 | King | 252/8.51 |
| 3,559,735 | 2/1971 | Corrin | 166/275 |
| 3,618,664 | 11/1971 | Harvey | 166/274 |
| 3,724,565 | 4/1973 | Kelly, Jr. | 166/294 |
| 3,727,412 | 4/1973 | Marx et al. | 166/294 |
| 3,788,406 | 1/1974 | Messenger | 175/72 |
| 3,998,270 | 12/1976 | Rodewald | 166/275 |
| 4,108,779 | 8/1978 | Carney | 252/8.515 |
| 4,385,999 | 5/1983 | McCrary | 252/8.51 |
| 4,391,329 | 7/1983 | Gallus | 106/90 X |
| 4,501,329 | 2/1985 | De Priester | 166/292 |
| 4,514,308 | 4/1985 | Clampitt et al. | 252/8.51 |
| 4,671,883 | 6/1987 | Connell et al. | 252/8.515 |
| 4,957,557 | 9/1990 | Dimitri | 106/123.1 |

Primary Examiner—John S. Maples
Assistant Examiner—C. Sayala
Attorney, Agent, or Firm—Finnegan, Henderson, Farabow, Garrett & Dunner

[57] ABSTRACT

A process for the manufacture of a water based drilling fluid additive comprising the steps of:
(a) premixing hydrophobic asphaltite and either a surfactant or a dispersant and
(b) shearing the mixture of step (a) under a sufficiently high mechanical shear for a sufficient time to convert the hydrophobic asphaltite into hydrophilic asphaltite. This invention is also directed to a water based drilling fluid additive prepared according to the above process and the use of the additive in a water based drilling fluid.

48 Claims, No Drawings

METHOD OF MAKING DRILLING FLUID CONTAINING ASPHALTITE IN A DISPERSED STATE

FIELD OF THE INVENTION

The present invention relates to a drilling fluid additive to provide enhanced fluid loss properties, enhanced wall cake thickness, and enhanced bore hole stability to the drilling fluid.

BACKGROUND OF THE INVENTION

In drilling wells for the purpose of producing oil or gas from subterranean deposits, a fluid known as drilling mud is used to perform several functions necessary to successfully complete each well. This drilling fluid or mud performs many functions such as lubricating the drill string, cleaning the bore hole, and exerting sufficient pressure to the sides of the bore hole to prevent the entrance of liquids or gases into the bore hole from the formation being penetrated.

The drilling fluid must have a low fluid loss to prevent excessive loss of fluid into the formation by depositing an impervious filter cake on the sides of the bore hole. The thickness of the filter cake is usually directly proportional to the volume of fluid loss. Therefore, the lower the fluid loss the thinner the filter cake. Maintaining the diameter of the bore hole being drilled is critical to a successful operation. If the fluid loss is high, then the wall cake will be thick and therefore, the desired diameter of the well bore will be reduced.

Fluid loss additives most commonly used to control the fluid loss and also the wall cake thickness are bentonite clays, polymers, lignites, and surfactants. Gilsonite, a native asphalt occurring in vein deposits below the surface of the ground, greatly reduces fluid loss and wall cake thickness when properly incorporated with any water based drilling fluid.

Gilsonite is an asphaltic material that is found in Utah and Colorado. Gilsonite and other asphaltic-type materials penetrate the shale pore spaces as the drill bit penetrates the formation. It is assumed that a plastic-flow mechanism will allow the asphaltite to extend into the pores of the shale, thus, reducing fluid loss or mud invasion with a tendency to bond the shale and prevent sloughing. Asphaltite plates out on the bore hole to thereby reduce fluid loss.

However, asphaltite is by nature extremely hydrophobic and will not readily mix with water or water based drilling fluids. Thus, it is difficult to use asphaltite as an effective drilling fluid additive.

Attempts have been made to make asphaltite-based products more compatible with the drilling fluid. However, none of these attempts has been fully successful.

Moreover, in typical drilling mud systems, the asphaltic material is packaged in fifty pound bags and dumped into the mud hopper on the rig in amounts equaling from 1 to 50 pounds per barrel of mud. Since the asphaltic material is extremely hydrophobic, a surfactant is then added to the mud system in amounts of 0.5 to 10 per cent by volume to make the asphaltite disperse or become water wet. However, this process is extremely expensive because the surfactant might be used up on other solid materials in the mud system, such as, barite, bentonite, and drilled solids.

Furthermore, the above mentioned process is very expensive because it does not allow the asphaltite enough retention time with the aqueous phase of the drilling fluid to become dispersed or broken up into individual particles. Therefore, much of the material is lost over the rig shaker after the initial or first circulation through the well bore. Rig shakers can now be operated with shaker screens as fine as 250 mesh with 80–100 mesh being standard. With the above methods of adding asphaltite products dry to the drilling fluid, a conservative estimate of at least 10% and up to 90% of the asphaltite product is screened out and lost over the rig shaker after the first circulation.

SUMMARY OF THE INVENTION

Accordingly, one object of the present invention is to provide a new and improved method of applying asphaltite based products to the drilling fluid to thereby drastically reduce the screening of the asphaltite out of the drilling fluid as the drilling fluid passes through the rig shaker.

In fact, the instant invention will allow 90% of the asphaltite based material to pass through a 200 mesh shaker screen and 99% through a 120 mesh screen. This reduced screening allows the asphaltite based material to remain in the drilling fluid system indefinitely and creates a more economical and environmentally safe method of achieving the benefits of the asphaltite.

Another object of the present invention is to provide an asphaltite dispersion which provides an improved particle size distribution of the asphaltite products.

A further object of this invention is to provide a method of adding the asphaltite product to the drilling fluid in such a manner that the person adding the product will not be subjected to the fine dust while adding the product in a dry form through the mud hopper on the drilling rig.

A still further object is to improve the lubricating properties of the drilling fluid.

A still further object is to improve the rheology properties of the drilling fluid.

The present invention accordingly provides a process for the manufacture of a water based drilling fluid additive. The process comprises the steps of:

(a) mixing hydrophobic asphaltite and either a surfactant or a dispersant and (b) shearing the mixture of step (a) under a sufficiently high mechanical shear for a sufficient time to convert the hydrophobic asphaltite into hydrophilic asphaltite.

The present invention also provides a water based drilling fluid additive prepared according to the above process.

The present invention further provides a water based drilling fluid comprising water and a water based drilling fluid additive as prepared above.

The present invention still further provides a process for enhancing the properties of a drilling fluid during the drilling of the well, by combining and circulating with a water based drilling mud, an additive as described above. The additive is mixed with the drilling mud in an amount to sufficiently reduce fluid loss and wall cake thickness.

The present invention still further provides a process of drilling a well with a rotary bit which comprises forming a bore hole with the bit while circulating a drilling mud through the bore hole. The drilling mud comprises an additive as described above and the additive is mixed with the drilling mud in an amount to sufficiently reduce fluid loss and wall cake thickness.

The process of the present invention offers a superior method of pre-dispersing and therefore wetting the surface area of the individual asphaltite, such as gilsonite, with a surfactant, emulsifier, or dispersant prior to adding the product to the drilling fluid. This process provides for a more even particle size distribution of the colloidal size particles as well as particles in the 1 to 200 micron size.

Additionally, the present invention overcomes the "fish-eye" condition that occurs when fine gilsonite particles are added to the drilling fluid. The fish-eye condition of the product is the balling up of many ultrafine particles which might be partially water wet on the outside but still dry in the center of the ball. The fisheye gilsonite particle is then screened out of the drilling fluid by the rig shakers.

These and other objects, features and advantages of the present invention will be made more apparent from the following description of the preferred embodiments.

DETAILED DESCRIPTION OF THE INVENTION

Reference will now be made in detail to the presently preferred embodiments of the invention.

In accordance with the present invention of manufacturing a water based drilling fluid additive, hydrophobic asphaltite is mixed with a surfactant or dispersant. This mixture is then sheared under a sufficiently high mechanical shear for a sufficient time to convert the hydrophobic asphaltite into hydrophilic asphaltite.

As a result, the surface area of asphaltite, such as gilsonite, is wetted and hydrophilic. This allows the gilsonite or asphaltite product to remain dispersed and separated into individual particles which stack or plate out on the side of the well bore to reduce fluid loss. These finely dispersed, surface coated particles act as excellent plugging agents for improved fluid loss control.

In the present invention, the asphaltite particles are in a state of dispersion having an average particle size much finer than their original size due to the shearing action in the environment of the surfactant or dispersant. The asphaltite particles become dispersed into much finer particles which expose more surface area. This surface area is then exposed to the surfactant which converts the hydrophobic asphaltite particle into a hydrophilic asphaltite particle. The asphaltite product thereby readily mixes and disperses with any water based drilling fluid.

Any inherently hydrophobic asphaltic material can be used in the present invention. A high grade mined pulverized gilsonite is preferred.

Surfactants of the present invention can be selected from, for example, ethoxylated phenols, alcohols, glycols, or fatty acid type materials. A preferred surfactant is ethoxylated glycol. Dispersants of the present invention can be selected from, for example, potassium hydroxide, sodium hydroxide, or lignitic type materials. The surfactants and dispersants are either liquid or solid but are preferably liquid.

The mixture of the asphaltite and the surfactant or dispersant are subjected to an extremely high mechanical shear to impart hydrophilic properties to the asphaltite. The mixture should perferably be subjected to a shear of at least 1700 rpms for at least 60 minutes.

A typical method of shearing the liquid mixture is by using a high speed mechanical disperser such as a ROTOSTAT ® 200XP-200, manufactured and sold by Admix, Inc. of Londonderry, N.H., USA.

Optionally, the mixture obtained after the shearing process may be adjusted to a pH of about 8 before the mixture is added to the drilling mud. The pH adjustment is a means to further disperse the solids of the invention in the liquid phase.

The asphaltite is preferably used in an amount of about from 5% to 90% by weight of the additive mixture. About 50% by weight of the asphaltite in the additive mixture is especially preferred.

If a surfactant is employed, the surfactant is preferably used in an amount of about from 5% to 90% by weight of the additive mixture. About 35% by weight of the surfactant in the additive mixture is especially preferred.

If a dispersant is employed, the dispersant is preferably used in an amount of about from 1% to 50% by weight of the additive mixture. About 10% by weight of the dispersant in the additive mixture is especially preferred.

The additive mixture comprising the asphaltite and either a surfactant or a dispersant is mixed with the drilling mud in an amount to sufficiently reduce fluid loss and wall cake thickness. The additive mixture is preferably used in from about ½% to about 30% by volume of the drilling mud. The additive mixture is more preferably used in from about 2% to about 5% by volume of the drilling mud.

The asphaltite additive can also include other components that are inherently hydrophobic prior to the shearing step.

The asphaltite additive can be utilized in drilling fluids while drilling oil wells, gas, wells, mineral wells, water wells, or any other earth boring operation.

The specific examples below will enable the invention to be better understood. However, they are given merely by way of guidance and do not imply any limitations.

EXAMPLE 1

Improved high pressure and temperature fluid loss and improved low pressure fluid loss The fluids in Table 1 below were circulated through a 100 mesh screen 25 times and then tests were run on the fluids in accordance with Table 1.

TABLE 1

|  | Base Mud | 2% by Volume dry Gilsonite | Percent Reduction | 2% by Volume Invention | Percent Reduction |
|---|---|---|---|---|---|
| 100 psi fluid loss (ml) | 5.4 | 4.4 | 19% | 1.8 | 67% |
| 500 psi fluid loss @ 300° (ml) | 29.5 | 21.2 | 28% | 11.0 | 63% |

Approximately 95% of the present invention additive remained in the drilling fluid after 25 circulations as opposed to 44% of the dry product. These calculations were made by collecting the solid product trapped on the 100 mesh screen, drying the same and then weighing the dry sample.

EXAMPLE 2

Decrease in the filter cake thickness

TABLE 2

|  | BASE | 2% INVENTION | PERCENT REDUCTION |
|---|---|---|---|
| 100 psi fluid loss (ml) | 2.4 | 1.8 | 25% |
| cake thickness (inches) | 2/32 | 1/32 | 50% |
| 500 psi fluid loss @ 300° (ml) | 22.5 | 11.0 | 50% |
| 500 psi cake thickness (inches) | 6/32 | 3/32 | 50% |

This invention reduced the size of the filter cakes. The uniform individual particle size distribution provided better compaction medium which restricts the flow of liquids from the drilling fluid.

EXAMPLE 3

Improved lubricity of the drilling fluid

TABLE 3

| PLATE PRESSURE (lbs) | BASE MUD (amperes) | 1% INVENTION (amperes) | PERCENT REDUCTION | 2% INVENTION (amperes) | PERCENT REDUCTION |
|---|---|---|---|---|---|
| 100 | 14 | 12 | 14% | 10 | 29% |
| 200 | 26 | 22 | 15% | 20 | 23% |
| 300 | 35 | 32 | 9% | 26 | 26% |
| 400 | 44 | 39 | 11% | 32 | 27% |
| 500 | 60 | 43 | 28% | 38 | 37% |
| 600 | SEIZURE | 60 | DID NOT SEIZE | 49 | DID NOT SEIZE |

The lubricity here refers to the lubricity characteristics of the drilling fluid in contact with the drill stem and bore hole walls. The drilling fluid lubricity was measured by the ability of the drilling fluid to reduce the coefficient of friction between two surfaces with the drilling fluid between the surfaces. The present invention reduced lubricity because it formed a film between the surfaces while minimizing wall cake build up.

EXAMPLE 4

Improved flow properties of the drilling fluid

The following results in Table 4 were achieved with the use of a montmorilinite and a water slurry.

TABLE 4

| BASE FLUID | | 1% INVENTION | |
|---|---|---|---|
| 600 RPM | 37 | 600 RPM | 16 |
| 300 RPM | 30 | 300 RPM | 10 |
| 200 RPM | 28 | 200 RPM | 8 |
| 100 RPM | 24 | 100 RPM | 5 |
| 6 RPM | 17 | 6 RPM | 1 |
| 3 RPM | 15 | 3 RPM | 1 |
| PV | 7 | PV | 6 |
| YP | 23 | YP | 4 |
| GELS | 15/38 | GELS | ¼ |

| BASE FLUID | | 1% INVENTION | | 2% INVENTION | |
|---|---|---|---|---|---|
| 16.8 ppg Low Lime Mud | | | | | |
| PV | 37 | PV | 39 | PV | 40 |
| YP | 14 | YP | 10 | YP | 8 |
| GELS | 2/8 | GELS | 2/6 | GELS | 1/5 |
| 10.5 Seawater Lignosulfonate | | | | | |
| PV | 17 | PV | 18 | PV | 19 |
| YP | 14 | YP | 10 | YP | 8 |
| GELS | 3/8 | GELS | 2/6 | GELS | ¼ |

PV = plastic viscosity
YP = yield point
GELS = gel strength

Thus, the invention also shows an added benefit of thinning drilling fluids.

Additionally, in the present invention, by depositing a thin impermeable filter cake on the well bore, water sensitive shale is stabilized. This invention provides individual gilsonite particles which plug off microfractures in the drilled formation to shut-off intrusion of the fluid into the formation. This invention therefore decreases the amount of capillary attractive forces present in the microfractures of the well bore.

It would be apparent to those skilled in the art that various modifications and variations can be made in the present invention without deviating from the scope or spirit of the invention. Thus, it is intended that the present invention covers the modifications and variations of this invention provided that these come within the scope of the following claims or their equivalents.

What is claimed is:

1. A process for the manufacture of a water based drilling fluid additive comprising the steps of:
   (a) mixing hydrophobic asphaltite and either a surfactant or a dispersant, and
   (b) shearing the mixture of step (a) under a sufficiently high mechanical shear for a sufficient time to convert the hydro-phobic asphaltite into hydrophilic asphaltite.

2. A process for the manufacture of a water based drilling fluid additive as claimed in claim 1, wherein said asphaltite is gilsonite.

3. A process for the manufacture of a water based drilling fluid additive as claimed in claim 2, wherein said hydrophilic asphaltite is of a dimension that enables 90% of the asphaltite to pass through a 200 mesh shaker screen.

4. A water based drilling fluid additive prepared according to claim 3.

5. A water based drilling fluid additive prepared according to claim 2.

6. A process for the manufacture of a water based drilling fluid additive as claimed in claim 1, wherein said hydrophilic asphaltite is of a dimension that enables 90% of the asphaltite to pass through a 200 mesh shaker screen.

7. A water based drilling fluid additive prepared according to claim 6.

8. A process for the manufacture of a water based drilling fluid additive as claimed in claim 1, further comprising the step of adjusting the pH of the sheared mixture of step (b) to approximately 8.

9. A process for the manufacture of a water based drilling fluid additive as claimed in claim 8, wherein said hydrophilic asphaltite is of a dimension that enables 90% of the asphaltite to pass through a 200 mesh shaker screen.

10. A water based drilling fluid additive prepared according to claim 8.

11. A process for the manufacture of a water based drilling fluid additive as claimed in claim 1, wherein the surfactant or the dispersant is a liquid.

12. A water based drilling fluid additive prepared according to claim 1.

13. A process for the manufacture of a water based drilling fluid additive as claimed in claim 1, wherein the mixture of step (a) is sheared under a mechanical shear of at least 10,000/sec for at least 1 hour.

14. A water based drilling fluid additive prepared according to claim 13.

15. A process for the manufacture of a water based drilling fluid additive as claimed in claim 1, wherein the mixture of step (a) is sheared under a mechanical shear of at least 10,000/sec for at least 2 hours.

16. A water based drilling fluid additive prepared according to claim 15.

17. A process for the manufacture of a water based drilling fluid additive as claimed in claim 1, wherein the mixture of step (a) is sheared with a mixer having an impeller tip speed of at least 40 ft/sec and the mixture of step (a) is sheared under a mechanical shear of at least 10,000/sec for at least 1 hour.

18. A process for the manufacture of a water based drilling fluid additive as claimed in claim 1, wherein the mixture of step (a) is sheared with a mixer having an impeller tip speed of at least 40 ft/sec and the mixture of step (a) is sheared under a mechanical shear of at least 10,000/sec for at least 2 hours.

19. A process for the manufacture of a water based drilling fluid additive as claimed in claim 1, wherein the mixture of step (a) is sheared with a mixer operating at 1700 rpm for at least 1 hour.

20. A process for the manufacture of a water based drilling fluid additive as claimed in claim 1, wherein the mixture of step (a) is sheared with a mixer operating at 1700 rpm for at least 2 hours.

21. A process for the manufacture of a water based drilling fluid additive as claimed in claim 1, wherein said surfactant is selected from the group consisting of phenols, alcohols, glycols, and fatty acid type materials and said dispersant is selected from the group consisting of potassium hydroxide, sodium hydroxide, and lignitic type materials.

22. A water based drilling fluid additive prepared according to claim 21.

23. A process for the manufacture of a water based drilling fluid additive as claimed in claim 1, wherein said surfactant is a glycol and said dispersant is selected from the group consisting of potassium hydroxide, sodium hydroxide, and lignitic type materials.

24. A process for the manufacture of a water based drilling fluid additive as claimed in claim 1, wherein a glycol surfactant is used.

25. A process for the manufacture of a water based drilling fluid additive as claimed in claim 1, wherein the mixture of step (a) is sheared under a mechanical shear of at least 10,000/sec for at least 1 hour and said surfactant is selected from the group consisting of phenols, alcohols, glycols, and fatty acid type materials and said dispersant is selected from the group consisting of potassium hydroxide, sodium hydroxide, and lignitic type materials.

26. A process for the manufacture of a water based drilling fluid additive as claimed in claim 25, wherein said asphaltite is gilsonite.

27. A water based drilling fluid additive prepared according to claim 26.

28. A water based drilling fluid additive prepared according to claim 25.

29. A water based drilling fluid additive comprising a hydrophilic asphaltite and either a surfactant or a dispersant.

30. A water based drilling fluid additive as claimed in claim 29, wherein said asphaltite is gilsonite.

31. A water based drilling fluid additive as claimed in claim 30, wherein said hydrophilic asphaltite is of a dimension that enables 90% of the asphaltite to pass through a 200 mesh shaker screen.

32. A water based drilling fluid comprising water and a water based drilling fluid additive as claimed in claim 31.

33. A water based drilling fluid comprising water and a water based drilling fluid additive as claimed in claim 30.

34. A water based drilling fluid additive as claimed in claim 29, wherein said hydrophilic asphaltite is of a dimension that enables 90% of the asphaltite to pass through a 200 mesh shaker screen.

35. A water based drilling fluid comprising water and a water based drilling fluid additive as claimed in claim 334.

36. A water based drilling fluid additive as claimed in claim 29, wherein said additive has a pH of approximately 8.

37. A water based drilling fluid additive as claimed in claim 36, wherein said hydrophilic asphaltite is of a dimension that enables 90% of the asphaltite to pass through a 200 mesh shaker screen.

38. A water based drilling fluid comprising water and a water based drilling fluid additive as claimed in claim 36.

39. A water based drilling fluid additive as claimed in claim 29, wherein the surfactant or the dispersant is a liquid.

40. A water based drilling fluid comprising water and a water based drilling fluid additive as claimed in claim 29.

41. A process for enhancing the properties of a drilling fluid during the drilling of a well comprising the steps of combining and circulating with a water based drilling mud, an additive as claimed in claim 29, said additive being mixed with the drilling mud in an amount to sufficiently reduce fluid loss and wall cake thickness.

42. A process of drilling a well with a rotary bit which comprises forming a bore hole with said bit while circulating a drilling mud through said bore hole, said drilling mud comprises an additive as claimed in claim 29, said additive being mixed with the drilling mud in an amount to sufficiently reduce fluid loss and wall cake thickness.

43. A water based drilling fluid additive as claimed in claim 29, wherein said surfactant is selected from the group consisting of phenols, alcohols, glycols, and fatty acid type materials and said dispersant is selected from the group consisting of potassium hydroxide, sodium hydroxide, and lignitic type materials.

44. A water based drilling fluid additive as claimed in claim 43, wherein said asphaltite is gilsonite.

45. A water based drilling fluid comprising water and a water based drilling fluid additive as claimed in claim 44.

46. A water based drilling fluid comprising water and a water based drilling fluid additive as claimed in claim 43.

47. A water based drilling fluid additive as claimed in claim 29, wherein said surfactant is a glycol and said dispersant is selected from the group consisting of potassium hydroxide, sodium hydroxide, and lignitic type materials.

48. A water based drilling fluid additive as claimed in claim 29, wherein a glycol surfactant is used.

* * * * *

UNITED STATES PATENT AND TRADEMARK OFFICE
CERTIFICATE OF CORRECTION

PATENT NO. : 5,114,598
DATED : May 19, 1992
INVENTOR(S) : JERRY RAYBORN et al.

It is certified that error appears in the above-indentified patent and that said Letters Patent is hereby corrected as shown below:

Claim 1, col. 6, line 44, delete "hydro-phobic" and insert therefor --hydrophobic--.

Claim 35, col. 8, line 31, delete "334" and insert therefor --34--.

Signed and Sealed this

Fourth Day of January, 1994

Attest:

BRUCE LEHMAN

Attesting Officer

Commissioner of Patents and Trademarks

REEXAMINATION CERTIFICATE (3303rd)

United States Patent [19]
Rayborn et al.

[11] B1 5,114,598
[45] Certificate Issued *Aug. 26, 1997

[54] METHOD OF MAKING DRILLING FLUID CONTAINING ASPHALTITE IN A DISPERSED STATE

[75] Inventors: Jerry J. Rayborn, Franklintown, La.; J. Phillip Dickerson, McComb, Miss.

[73] Assignee: Sun Drilling Products Corporation, Belle Chasse, La.

Reexamination Requests:
No. 90/002,995, Mar. 9, 1993
No. 90/003,667, Dec. 20, 1994

Reexamination Certificate for:
Patent No.: 5,114,598
Issued: May 19, 1992
Appl. No.: 473,474
Filed: Feb. 1, 1990

[*] Notice: The portion of the term of this patent subsequent to May 19, 2009, has been disclaimed.

Certificate of Correction issued Jan. 4, 1994.

[51] Int. Cl.$^6$ .................................................. C09K 7/02
[52] U.S. Cl. .................... 507/126; 507/106; 507/107; 507/138; 507/139

[58] Field of Search .................................................. 507/126

[56] References Cited

U.S. PATENT DOCUMENTS

| | | |
|---|---|---|
| 3,718,585 | 2/1973 | Lummus et al. |
| 3,723,311 | 3/1973 | Lummus et al. |
| 3,788,406 | 1/1974 | Messenger. |

FOREIGN PATENT DOCUMENTS

| | | |
|---|---|---|
| 972141 | 8/1975 | Canada. |

*Primary Examiner*—Philip C. Tucker

[57] ABSTRACT

A process for the manufacture of a water based drilling fluid additive comprising the steps of:

(a) premixing hydrophobic asphaltite and either a surfactant or a dispersant and (b) shearing the mixture of step (a) under a sufficiently high mechanical shear for a sufficient time to convert the hydrophobic asphaltite into hydrophilic asphaltite. This invention is also directed to a water based drilling fluid additive prepared according to the above process and the use of the additive in a water based drilling fluid.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 29, 30, 33, 36 and 38–48 are cancelled.

Claims 1–28, 31, 32, 34, 35 and 37 are determined to be patentable as amended.

1. A process for the manufacture of a *liquid additive for a water based drilling fluid* [additive] comprising the steps of:
   (a) mixing hydrophobic asphaltite and either a surfactant or a dispersant *to form a liquid mixture*, and
   (b) shearing the liquid mixture of step (a) under a sufficiently high mechanical shear [for a sufficient time] to convert the [hydro-phobic] *hydrophobic* asphaltite into hydrophilic asphaltite.

2. A process for the manufacture of a *liquid additive for a water based drilling fluid* [additive] as claimed in claim 1, wherein said asphaltite is gilsonite.

3. A process for the manufacture of a *liquid additive for a water based drilling fluid* [additive] as claimed in claim 2, wherein said hydrophilic asphaltite is of a dimension that enables 90% of the asphaltite to pass through a 200 mesh shaker screen.

4. A *liquid additive for a* water based drilling fluid [additive] prepared according to claim 3.

5. A *liquid additive for a* water based drilling fluid [additive] prepared according to claim 2.

6. A process for the manufacture of a *liquid additive for a water based drilling fluid* [additive] as claimed in claim 1, wherein said hydrophilic asphaltite is of a dimension that enables 90% of the asphaltite to pass through a 200 mesh shaker screen.

7. A *liquid additive for a* water based drilling fluid [additive] prepared according to claim 6.

8. A process for the manufacture of a *liquid additive for a water based drilling fluid* [additive] as claimed in claim 1, further comprising the step of adjusting the pH of the sheared mixture of step (b) to approximately 8.

9. A process for the manufacture of a *liquid additive for a water based drilling fluid* [additive] as claimed in claim 8, wherein said hydrophilic asphaltite is of a dimension that enables 90% of the asphaltite to pass through a 200 mesh shaker screen.

10. A *liquid additive for a* water based drilling fluid [additive] prepared according to claim 8.

11. A process for the manufacture of a *liquid additive for a water based drilling fluid* [additive] as claimed in claim 1, wherein the surfactant or the dispersant is a liquid *surfactant*.

12. A *liquid additive for a* water based drilling fluid [additive] prepared according to claim 1.

13. A process for the manufacture of a *liquid additive for a water based drilling fluid* [additive] as claimed in claim 1, wherein the mixture of step (a) is sheared under a mechanical shear of at least 10,000/sec for at least 1 hour.

14. A *liquid additive for a* water based drilling fluid [additive] prepared according to claim 13.

15. A process for the manufacture of a *liquid additive for a water based drilling fluid* [additive] as claimed in claim 1, wherein the mixture of step (a) is sheared under a mechanical shear of at least 10,000/sec for at least 2 hours.

16. A *liquid additive for a* water based drilling fluid [addditive] prepared according to claim 15.

17. A process for the manufacture of a *liquid additive for a water based drilling fluid* [additive] as claimed in claim 1, wherein the mixture of step (a) is sheared with a mixer having an impeller tip speed of at least 40 ft/sec and the mixture of step (a) is sheared under a mechanical shear of at least 10,000/sec for at least 1 hour.

18. A process for the manufacture of a *liquid additive for a water based drilling fluid* [additive] as claimed in claim 1, wherein the mixture of step (a) is sheared with a mixer having an impeller tip speed of at least 40 ft/sec and the mixture of step (a) is sheared under a mechanical shear of at least 10,000/sec for at least 2 hours.

19. A process for the manufacture of a *liquid additive for a water based drilling fluid* [additive] as claimed in claim 1, wherein the mixture of step (a) is sheared with a mixer operating at 1700 rpm for at least 1 hour.

20. A process for the manufacture of a *liquid additive for a water based drilling fluid* [additive] as claimed in claim 1, wherein the mixture of step (a) is sheared with a mixer operating at 1700 rpm for at least 2 hours.

21. A process for the manufacture of a *liquid additive for a water based drilling fluid* [additive] as claimed in claim 1, wherein said surfactant is selected from the group consisting of phenols, alcohols, glycols, and fatty acid type materials and said dispersant is selected from the group consisting of potassium hydroxide, sodium hydroxide, and lignitic type materials.

22. A *liquid additive for a* water based drilling fluid [additive] prepared according to claim 21.

23. A process for the manufacture of a *liquid additive for a water based drilling fluid* [additive] as claimed in claim 1, wherein said surfactant is a glycol and said dispersant is selected from the group consisting of potassium hydroxide, sodium hydroxide, and lignitic type materials.

24. A process for the manufacture of a *liquid additive for a water based drilling fluid* [additive] as claimed in claim 1, wherein a glycol surfactant is used.

25. A process for the manufacture of a *liquid additive for a water based drilling fluid* [additive] as claimed in claim 1, wherein the mixture of step (a) is sheared under a mechanical shear of at least 10,000/sec for at least 1 hour and said surfactant is selected from the group consisting of phenols, alcohols, glycols, and fatty acid type materials and said dispersant is selected from the group consisting of potassium hydroxide, sodium hydroxide, and lignitic type materials.

26. A process for the manufacture of a *liquid additive for a water based drilling fluid* [additive] as claimed in claim 25, wherein said asphaltite is gilsonite.

27. A *liquid additive for a* water based drilling fluid [additive] prepared according to claim 26.

28. A *liquid additive for a* water based drilling fluid [additive] prepared according to claim 25.

31. A *liquid additive for a* water based drilling fluid [additive] as claimed in claim 30, wherein said hydrophilic asphaltite is of a dimension that enables 90% of the asphaltite to pass through a 200 mesh shaker screen.

32. A water based drilling fluid comprising water and a *liquid additive for a* water based drilling fluid [additive] as claimed in claim 31.

34. A *liquid additive for a* water based drilling fluid [additive] as claimed in claim 29, wherein said hydrophilic asphaltite is of a dimension that enables 90% of the asphaltite to pass through a 200 mesh shaker screen.

35. A water based drilling fluid comprising water and a *liquid additive for a* water based drilling fluid [additive] as claimed in claim 34.

37. A *liquid additive for a* water based drilling fluid [additive] as claimed in claim 36, wherein said hydrophilic asphaltite is of a dimension that enables 90% of the asphaltite to pass through a 200 mesh shaker screen.

\* \* \* \* \*